No. 829,666. PATENTED AUG. 28, 1906.
W. O. PERRY.
EXTENSION BEDSTEAD.
APPLICATION FILED DEC. 4, 1905.
2 SHEETS—SHEET 1.
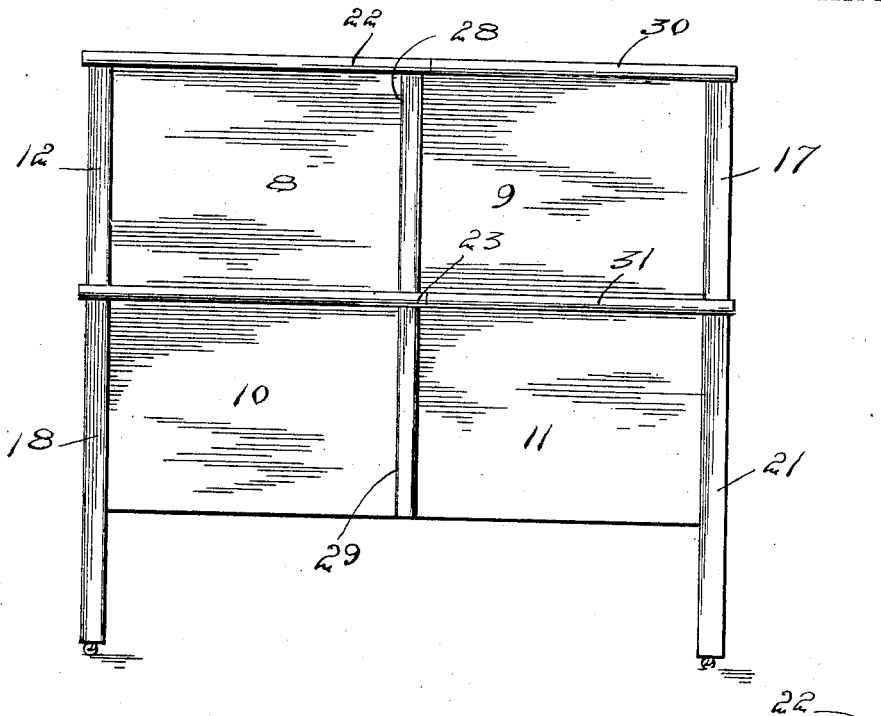
Fig. 1.
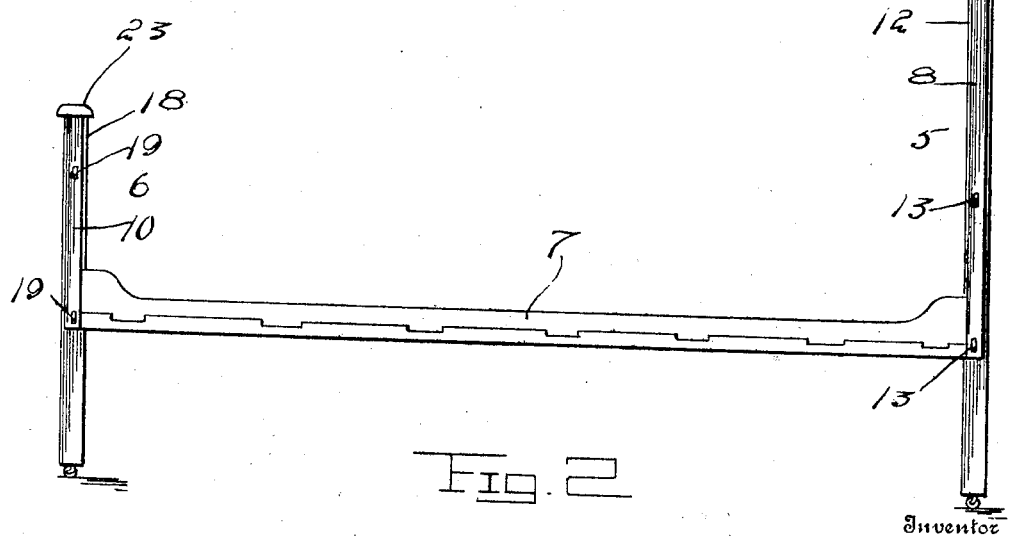
Fig. 2.
Witnesses
J. C. Simpson
J. C. Jones
Inventor
W. O. Perry
By 
Attorneys No. 829,666. PATENTED AUG. 28, 1906.
W. O. PERRY.
EXTENSION BEDSTEAD.
APPLICATION FILED DEC. 4, 1905.

2 SHEETS—SHEET 2.

Witnesses
J. C. Simpson
F. C. Jones

Inventor
W. O. Perry
By Chandler & Chandler
Attorneys

THE NORRIS PETERS CO., WASHINGTON, D. C.

UNITED STATES PATENT OFFICE.

WALTER O. PERRY, OF HAZEN, ARKANSAS.

EXTENSION-BEDSTEAD.

No. 829,666.     Specification of Letters Patent.     Patented Aug. 28, 1906.

Application filed December 4, 1905. Serial No. 290,268.

*To all whom it may concern:*

Be it known that I, WALTER O. PERRY, a citizen of the United States, residing at Hazen, in the county of Prairie, State of Arkansas, have invented certain new and useful Improvements in Extension-Bedsteads; and I do hereby declare the following to be a full, clear, and exact description of the invention, such as will enable others skilled in the art to which it appertains to make and use the same.

This invention relates to extension-bedsteads, and has for its object to provide a bedstead of this character which may be quickly converted from a single bed to a double bed, or the reverse.

A further object of the invention is to provide a construction of extension-bedstead which will be extremely simple and in which the weight of the occupant will serve to more tightly unite the parts of the same.

Figure 3:
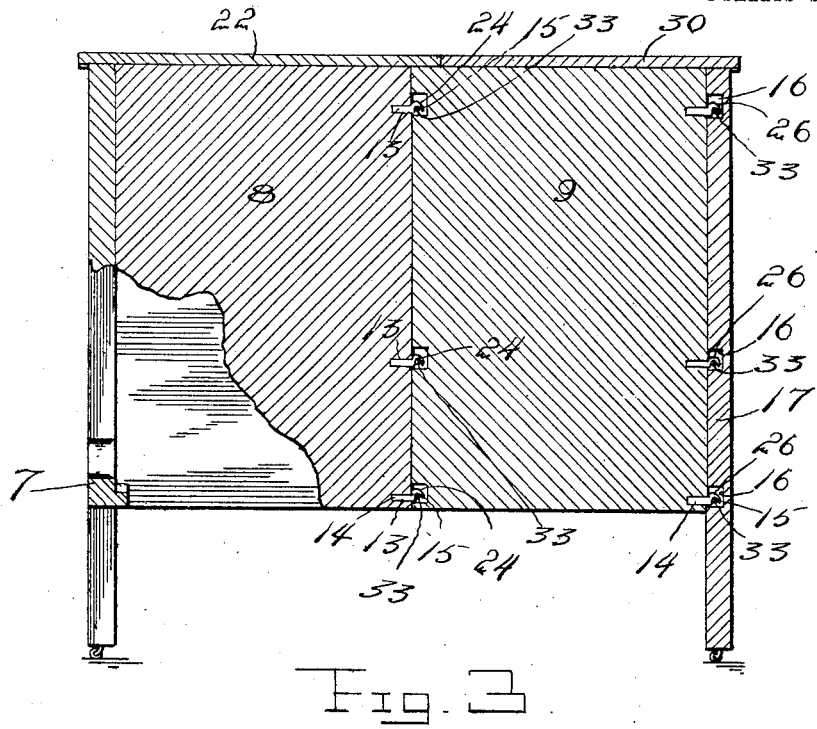
Figure 4:
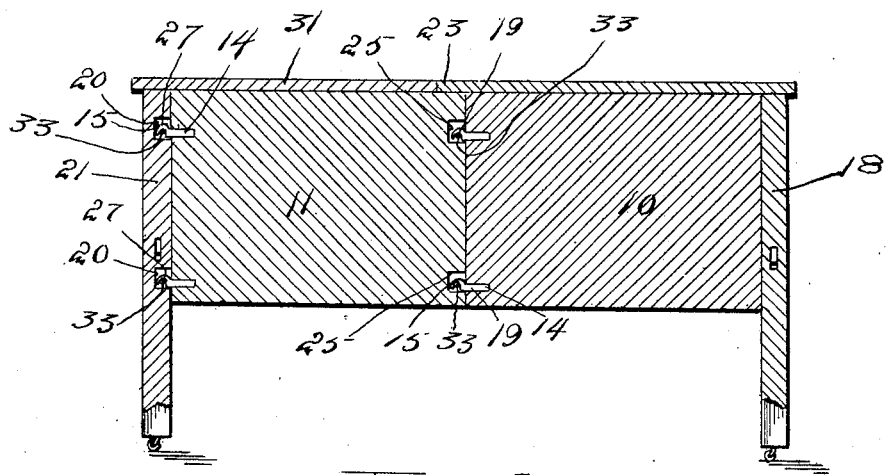

In the accompanying drawings, Figure 1 is a front elevation of my invention when in the form of a double bed. Fig. 2 is a side elevation of one-half of the double bedstead. Fig. 3 is a vertical section through a portion of the headboard. Fig. 4 is a similar view through a portion of the footboard.

Referring to the drawings, the numerals 5 and 6 denote, respectively, the head and foot sections of a bedstead constructed in accordance with my invention, and 7 the side rails uniting the same. The head and foot sections 5 and 6 include headboards 8 and 9 and footboards 10 and 11, respectively.

The headboard 8 is provided at one of its sides with a head-post 12, which is secured rigidly to the said headboard, and at its other side with a vertical series of hook members 13. Each of these hook members comprises a shank 14, which is embedded in the headboard and serves to retain the hook member thereon and with a bill 15, which is formed by turning the outer portion of the shank 14 upwardly and thence downwardly in spaced relation to the extreme outer end of the said shank.

When the bedstead is arranged for use as a single bed, the hook members 13 are engaged in corresponding recesses 16 formed in the other head-post 17. The footboard 10 is substantially of the same construction as the headboard 8, it being provided at one of its sides with a fixed foot-post 18 and at the other of its sides with a vertical series of hook members 19, which are of the same construction as the hook members 13 and which are arranged for engagement in corresponding recesses 20 in the other of the foot-posts 21.

The headboard 8 and the footboard 10 are each provided at their upper edge with top rails 22 and 23, respectively, which extend laterally beyond the head and foot posts of the bed.

In order that the bedstead may be converted from a single to a double one, I provide the above-mentioned additional head and foot boards 9 and 11, respectively. In constructing the double bedstead the hook members 13 are engaged in recesses 24 formed in one side of the headboard 9 and the hook members 19, carried by the footboard 10, are engaged in recesses 25 formed in one side of the footboard 11, the headboard 9 and the footboard 11 being provided at their other side with vertical series of hooks 26 and 27, respectively, which are arranged for engagement in the recesses 16 and 20 in the head-post 17 and the foot-post 21, respectively.

Each of the head and foot boards 9 and 11 are provided at their meeting edges with the head and foot boards 8 and 10 with vertical strips 28 and 29, respectively, which project laterally beyond the said edges of the said head and foot boards and overlap the corresponding edges of the head and foot boards 8 and 9. Each of the head and foot boards 9 and 11 is provided with a top rail 30 and 31, respectively, one end of each of the rails terminating short of the meeting edges of said head and foot boards with the head and foot boards 8 and 10 and the other ends of said rails extending laterally beyond the said head and foot boards 9 and 11, it being understood that the top rails 22 and 23 carried by the headboard 8 and the footboard 10 overlap a portion of the upper edge of the head and foot boards 9 and 11, respectively.

Mounted transversely in each of the recesses in the head and foot boards 9 and 11 and the head and foot posts 17 and 21 is a pin 33, behind which the bill 15 of the hook members 13, 19, 26, and 27 are adapted to seat.

What is claimed is—

1. In an extension-bedstead the combination with head and foot sections including head and foot boards formed in sections and detachably connected, of top rails carried by the registering members of the head and foot boards, one of the top rails of each section being arranged to overlie the upper end of the respective head and foot posts when the other of the head and foot board sections are removed.

2. In an extension-bedstead the combination with head and foot sections including head and foot boards respectively, said head and foot boards being formed in sections, of top rails carried by one of the sections of the head and foot boards and having one of their ends overlapping a portion of the other sections of the head and foot boards, and top rails carried by the other of said sections and having one of their ends overlapping the upper ends of the head and foot posts of the bed.

In testimony whereof I affix my signature in presence of two witnesses.

WALTER O. PERRY.

Witnesses:
 JAMES M. PERRY,
 C. A. LINDLEY.